United States Patent
Jin et al.

(10) Patent No.: US 12,051,223 B2
(45) Date of Patent: Jul. 30, 2024

(54) POSITIONING METHOD, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventors: Ke Jin, Guangdong (CN); Yuchen Yang, Guangdong (CN); Yan Chen, Guangdong (CN); Pan Fang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 399 days.

(21) Appl. No.: 17/686,091

(22) Filed: Mar. 3, 2022

(65) Prior Publication Data
US 2022/0262039 A1    Aug. 18, 2022

Related U.S. Application Data (63) Continuation of application No. PCT/CN2020/116920, filed on Sep. 22, 2020.

(30) Foreign Application Priority Data

Sep. 27, 2019  (CN) ............. 201910921654.0

(51) Int. Cl.
  *G06V 10/00*   (2022.01)
  *G06T 7/55*   (2017.01)
  (Continued)

(52) U.S. Cl.
  CPC ............. *G06T 7/80* (2017.01); *G06T 7/55* (2017.01); *G06T 7/62* (2017.01); *G06T 2207/10028* (2013.01)

(58) Field of Classification Search
  CPC .... G06T 7/80; G06T 7/55; G06T 7/73; G06T 7/62; G06T 7/85; G06T 2207/10028;
  (Continued)

(56) References Cited

U.S. PATENT DOCUMENTS 8,588,515 B2 * 11/2013 Bang .................. G06T 5/50
                                                  382/254
9,531,969 B2 * 12/2016 Shiozaki ............. G06T 7/194
(Continued)

FOREIGN PATENT DOCUMENTS

CN    104517289 A    4/2015
CN    105453139 A    3/2016
(Continued)

OTHER PUBLICATIONS

Newcombe et al.," KinectFusion?Real-Time Dense Surface Mapping and Tracking", IEEE International Symposium on Mixed and Augmented Reality Science and Technology Proceedings, XP032201443,978-1-4577-2185-4/10, Basel, Switzerland, Oct. 26-29, 2011. (127-136 pages).
(Continued)

*Primary Examiner* — Amir Alavi
(74) *Attorney, Agent, or Firm* — Young Basile Hanlon & MacFarlane, P.C.

(57) ABSTRACT

Disclosed are a positioning method, an electronic device, and a storage medium. The method includes: converting, according to an intrinsic parameter matrix of an image acquisition module and depth values of multiple pixel points in a depth image captured by the image acquisition module, pixel coordinates of the multiple pixel points into camera coordinates; and matching the camera coordinates of the respective pixel points with target world coordinates of multiple voxels in a pre-established point cloud map, and obtaining a positioning result of the image acquisition
(Continued)

---

S501 — A size of a specific physical space is quantified to obtain initial world coordinates of multiple voxels S502 — According to multiple sample image pairs captured in the specific physical space by the image acquisition module, an initial world coordinate of each voxel is updated to obtain a target world coordinate of each voxel, wherein the sample image pair includes a two-dimensional sample image and a depth sample image S503 — According to the target world coordinate of each voxel, a point cloud map is established module; wherein the target world coordinates of the respective voxels are obtained by updating initial world coordinates of the respective voxels according to multiple sample image pairs, and a sample image pair comprises a two-dimensional sample image and a depth sample image.

20 Claims, 3 Drawing Sheets

(51) Int. Cl.
*G06T 7/62* (2017.01)
*G06T 7/80* (2017.01)

(58) Field of Classification Search
CPC .. G06T 2207/30244; G06N 3/08; G06N 3/02; G06N 3/082; G06N 3/92; G06N 3/042; G06N 3/045; G06N 3/047; G06N 3/0454; G06N 3/0464; G06N 3/0475; G06N 20/00; G06N 20/10; G06N 20/20
See application file for complete search history.

(56) References Cited

U.S. PATENT DOCUMENTS

| | | | | |
|---|---|---|---|---|
| 10,154,282 | B2* | 12/2018 | Yu | H04N 19/52 |
| 10,353,465 | B2* | 7/2019 | Qin | G06F 3/013 |
| 11,315,265 | B2* | 4/2022 | Xu | G06T 7/60 |
| 11,532,127 | B2* | 12/2022 | Meng | G06T 7/251 |
| 11,741,631 | B2* | 8/2023 | Serackis | G06T 7/251 382/100 |
| 11,875,583 | B2* | 1/2024 | Yang | G06V 10/7792 |
| 11,893,675 | B1* | 2/2024 | Bhushan | G06T 17/05 |
| 2014/0064602 | A1 | 3/2014 | Li et al. | |
| 2015/0245062 | A1* | 8/2015 | Shimizu | H04N 13/111 375/240.15 |
| 2017/0148155 | A1 | 5/2017 | Wei | |
| 2019/0073795 | A1 | 3/2019 | Matsuzawa | |
| 2022/0262039 | A1* | 8/2022 | Jin | G06T 7/73 |

FOREIGN PATENT DOCUMENTS

| | | | |
|---|---|---|---|
| CN | 106384353 | A | 2/2017 |
| CN | 106780576 | A | 5/2017 |
| CN | 107590832 | A | 1/2018 |
| CN | 108563989 | A | 9/2018 |
| CN | 108648240 | A | 10/2018 |
| CN | 108986161 | A | 12/2018 |
| CN | 109579852 | A | 4/2019 |
| CN | 110675457 | A | 1/2020 |
| CN | 110728717 | A | 1/2020 |
| WO | 2017164479 | A1 | 9/2017 |

OTHER PUBLICATIONS

Anonymous, "Iterative closest point", Wikipedia, XP055953906? Retrieved from the Internet ?<URL:https://en.wikipedia.org/w/index.php?title=Iterative_closest_point&oldid=917312579>, dated Sep. 23, 2019. (1 page).
Extended European Search Report for EP Application 20869168.3 mailed Sep. 16, 2022. (9 pages).
Principle of generating point cloud data by depth camera, Available on https://www.cnblogs.com/sxy370921/p/11633568.html, Aug. 4, 2019, 6 pages.
Scene Coordinate Regression Forests for Camera Relocalization in RGB-D Images, Microsoft Research, Cambridge, UK, 8 pages.
Chinese First Office Action with English Translation for CN Application 201910921654.0 mailed Dec. 2, 2021. (18 pages).
International Search Report with English Translation for PCT Application PCT/CN2020/116920 mailed Dec. 21, 2020. (15 pages).

* cited by examiner

POSITIONING METHOD, ELECTRONIC DEVICE, AND STORAGE MEDIUM

CROSS-REFERENCE TO RELATED APPLICATION(S)

The present application is a continuation-application of International (PCT) Patent Application No. PCT/CN2020/116920 filed on Sep. 22, 2020, which claims priority to Chinese patent application No. 201910921654.0 filed on Sep. 27, 2019, the entire contents of both of which are hereby incorporated by reference.

TECHNICAL FIELD

Embodiments of the present application relate to electronic technology, and in particular to, but are not limited to, a positioning method, an electronic device, and a storage medium.

BACKGROUND

In related technologies of positioning based on image information, at present, a location of a person is mainly determined by identifying the person and fixed objects in an image collected by a camera module. This solution matches a fixed object in the image with a pre-built indoor map to determine a corresponding indoor position of the fixed object, and thus an indoor position of the person is determined according to the position of the fixed object; wherein, an overall idea of determining the position of the person is to identify the fixed object in the image through an image recognition method, and determine the position of the person according to a relative position relationship between the fixed object and the person in the image and the indoor position of the fixed object.

However, this positioning method mainly performs positioning based on the relative position relationship between the person and the fixed object in the image. In this way, when implementing positioning, it is required that the image must have a person and a fixed object that are recognizable therein, otherwise the positioning will fail, so robustness of this positioning method is poor.

SUMMARY

A positioning method provided by an embodiment of the present application includes: according to an intrinsic parameter matrix of an image acquisition module and depth values of multiple pixel points in a depth image captured by the image acquisition module, converting pixel coordinates of the multiple pixel points into camera coordinates; and matching a camera coordinate of each pixel point with target world coordinates of multiple voxels in a pre-established point cloud map and obtaining a positioning result of the image acquisition module; wherein the target world coordinate of each voxel is obtained by updating an initial world coordinate of each voxel according to multiple sample image pairs, and the sample image pair comprises a two-dimensional sample image and a depth sample image.

An electronic device provided by an embodiment of the present application includes a memory and a processor, the memory stores a computer program executable in the processor, and the processor, when executing the program, implements operations of the positioning method according to embodiments of the present application.

A non-transitory computer-readable storage medium provided by an embodiment of the present application stores a computer program, and the computer program, when being executed by a processor, implements operations of the positioning method according to embodiments of the present application.

BRIEF DESCRIPTION OF DRAWINGS

The drawings here are incorporated into the specification and constitute a part of the specification. These drawings illustrate embodiments that conform to the present application, and are used together with the specification to illustrate the technical solution of the present application.

DETAILED DESCRIPTION

In order to make purposes, technical solutions, and advantages of embodiments of the present application be clearer, specific technical solutions of the present application will be further described in detail below with reference to the drawings in embodiments of the present application. The following embodiments are used to illustrate the present application, but are not used to limit the scope of the present application.

Unless otherwise defined, all technical and scientific terms used herein have the same meaning as commonly understood by those skilled in the technical field of the present application. The terms used herein are only for the purpose of describing the embodiments of the present application, and are not intended to limit the present application.

In the following description, "some embodiments" are referred to, which describes a subset of all possible embodiments, but it is understood that "some embodiments" may be the same subset or different subsets of all possible embodiments, and can be combined with each other without conflict.

It should be pointed out that the term "first\second\third" involved in the embodiments of the present application is used to distinguish different objects, and does not represent a specific order for the objects. Understandably, "first\second\third" can interchange specific orders or sequences when being permitted, so that the embodiments of the present application described herein can be implemented in a sequence other than those illustrated or described herein.

An embodiment of the present application provides a positioning method, the method can be applied to electronic device, the electronic device can be apparatuses with information processing capabilities such as mobile phones, tablet computers, notebook computers, desktop computers, servers, robots, drones, etc. Functions implemented by the positioning method can be implemented by a processor in the electronic device calling program codes. Of course, the program code scan be stored in a computer storage medium. It can be seen that the electronic device includes at least a processor and a storage medium.

Figure 1:
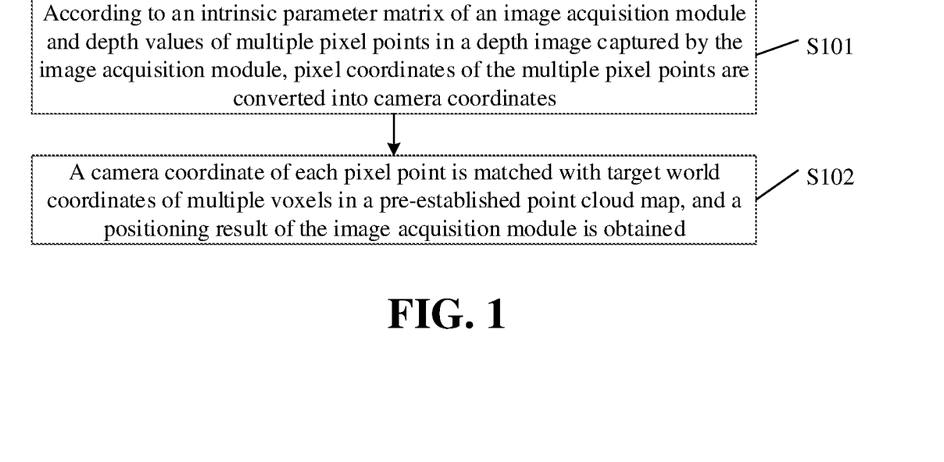
FIG. 1 is a schematic diagram of a flow of implementing a positioning method according to an embodiment of the present application.

FIG. 1 is a schematic diagram of a flow of implementing a positioning method according to an embodiment of the present application. As shown in FIG. 1, the method can include the following operations S101 to S102.

Operation S101, according to an intrinsic parameter matrix of an image acquisition module and depth values of multiple pixel points in a depth image captured by the image acquisition module, pixel coordinates of the multiple pixel points are converted into camera coordinates.

The image acquisition module generally incudes a first camera module and a second camera module; wherein the first camera module is configured to capture two-dimensional images of scenes, for example, capture red, green, blue (RGB) images of scenes through a one-eyed camera; the second camera module is configured to capture depth images of screening scenes, the second camera module can be a three-dimensional visual sensor, such as a two-eyed camera, a structural light camera, a time-of-flight (TOF) camera, etc.

It needs to be noted that an electronic device can include the image acquisition module, that ism the image acquisition module is installed in the electronic device. For example, the electronic device is a smart phone having the first camera module and the second camera module; of course, in some embodiments, the electronic device may also not include the image acquisition module, and the image acquisition module can transmit its own intrinsic parameter matrix and captured depth images to the electronic device.

In some embodiments, if a focal distance $f$ of the image acquisition module and a pixel coordinate $(u_0, v_0)$ of an image center point are known, as shown in the following formula (1), an intrinsic parameter matrix F of the image acquisition module is:

$$F = \begin{bmatrix} \frac{f}{dx} & 0 & u_0 \\ 0 & \frac{f}{dy} & v_0 \\ 0 & 0 & 1 \end{bmatrix} \quad (1)$$

In this formula, $$\frac{f}{dx}$$

represents a focal distance component of the focal distance $f$ on an x axis of a camera coordinate system;

$$\frac{f}{dy}$$

represents a focal distance component of the focal distance $f$ on a y axis of the camera coordinate system.

The depth image is also called as a distance image, which refers to an image taking distances from the image acquisition module to points of a surface of an object in a scene as pixel values. That is, a pixel value of a pixel point in the depth image is: in a visual field of a three-dimensional visual sensor, a distance from a certain point on a surface of an object to a lens of the sensor. The pixel value is generally called as a depth value. Therefore, in the case that a depth value $z_c$ of a pixel point j is known, it is possible to convert pixel coordinates (u, v) of the pixel point j into camera coordinates $(x_c, y_c, z_c)$ according to the following formula (2):

$$z_c \begin{pmatrix} u \\ v \\ 1 \end{pmatrix} = \begin{bmatrix} \frac{f}{dx} & 0 & u_0 \\ 0 & \frac{f}{dy} & v_0 \\ 0 & 0 & 1 \end{bmatrix} \begin{bmatrix} x_c \\ y_c \\ z_c \\ 1 \end{bmatrix} \quad (2)$$

It needs to be noted that since a Z axis of a camera coordinate system is an optical axis of a lens, the depth value of the pixel point j is a Z axis coordinate value $z_c$ in the camera coordinates of the pixel point.

Operation S102, a camera coordinate of each pixel point is matched with target world coordinates of multiple voxels in a pre-established point cloud map, and a positioning result of the image acquisition module is obtained.

Generally speaking, a target world coordinate of a voxel is a world coordinate of a certain point (such as a center point) of the voxel. In a point cloud map, a target world coordinate of each voxel is obtained by the electronic device by updating initial world coordinates of each voxel according to a plurality of sample image pairs including two-dimensional sample images and depth sample images. A construction process for a point cloud map can include operation S501 to operation S503 in the following embodiment.

In some embodiments, a positioning result includes current world coordinates of the image acquisition module; alternatively, the positioning result includes current world coordinates and an orientation of the image acquisition module. That is, the positioning result includes a position of a user (or device) carrying the image acquisition module, or includes a position and a posture of the user (or device). The world coordinates can be two-dimensional coordinates, and can also be three-dimensional coordinates. Understandably, the orientation of the image acquisition module is obtained through the operation S102, so that the positioning method can be applied to more application scenarios. For example, according to a current orientation of a robot, the robot is instructed to perform the next action. For another example, in a navigation application, knowing a user's orientation can more accurately guide the user which direction to walk/drive in. For another example, in an unmanned driving application, knowing a direction of a vehicle can more accurately control which direction the vehicle is traveling in.

In embodiments of the present application, according to matching camera coordinates of multiple pixel points in a depth image captured by an image acquisition module with target world coordinates of multiple voxels in a pre-established point cloud map, a positioning result of the image acquisition module can be determined; in this way, when the image acquisition module is positioned, its positioning method does not depend on that a depth image must have a fixed object and an object to be positioned therein, and thus can obtain better robustness.

An embodiment of the present application further provides a positioning method, the method can include the following operations S201 to S203.

Operation S201, according to an intrinsic parameter matrix of an image acquisition module and depth values of multiple pixel points in a depth image captured by the image acquisition module, pixel coordinates of the multiple pixel points are converted into camera coordinates.

Operation S202, according to an iteration strategy, a camera coordinate of each pixel point is matched with target world coordinates of multiple voxels in a pre-established point cloud map, and a target transformation relationship of a camera coordinate system relative to a world coordinate system is obtained.

In this embodiment of the present application, the point cloud map includes target world coordinates of the voxels, but does not include image features of the voxels; in this way, data amount of the point cloud map can be greatly reduced, so as to save storage space of the point cloud map in an electronic device.

In the case that the point cloud map does not include the image features of the voxels, that is, on the premise that the camera coordinate of each pixel point in the depth image captured by the image acquisition module and the target world coordinates of multiple voxels in the point cloud map are known, through an iterative strategy, it is tried to find a target transformation relationship of a camera coordinate system relative to a world coordinate system, so that positioning of the image acquisition module can be realized. For the search of the target transformation relationship, for example, through operations S302 to S306, or operations S402 to S409 in the following embodiments, the voxel being closest (that is, the best match) to each pixel is iteratively searched and thus the target transformation relationship is obtained.

Operation S203, according to the target transformation relationship, a positioning result of the image acquisition module is obtained.

In the positioning method provided by this embodiment of the present application, there is no need for the image acquisition module to capture a two-dimensional image, and no need to extract image features of each pixel from the two-dimensional image. Instead, based on the intrinsic parameter matrix and the depth value of each pixel point in the depth image, the pixel coordinates corresponding to the pixel points are converted into camera coordinates. Then, through an iterative strategy, the camera coordinate of each pixel point is matched with the target world coordinates of multiple voxels to achieve accurate positioning for the image acquisition module; in this way, the implementation complexity of the positioning method can be reduced, thereby achieving positioning more efficiently and meeting the real-time requirements of positioning.

An embodiment of the present application further provides a positioning method, the method can include the following operations S301 to S307.

Operation S301, according to an intrinsic parameter matrix of an image acquisition module and depth values of multiple pixel points in a depth image captured by the image acquisition module, pixel coordinates of the multiple pixel points are converted into camera coordinates.

Operation S302, selecting an initial target voxel matching with each pixel point from multiple voxels of a pre-established point cloud map.

In some embodiments, an electronic device can set an initial transformation relationship of a camera coordinate system relative to a world coordinate system; thus, according to the camera coordinate of each pixel point and the initial transformation relationship, the pixel point is matched with the multiple voxels, such that an initial target voxel matching with the pixel point is selected from the multiple voxels. In some embodiments, the initial target voxel can be selected through the operations S402 to S404 in the following embodiment.

In fact, through the operation S302, the purpose is to select voxels that may match with the pixel points, that is, the selected initial target voxel may not be an object that actually matches with the pixel point; therefore, it is necessary to further determine whether the initial target voxel is an object that really matches with the pixel point through the following operations S303 to S306.

Operation S303, according to a camera coordinate of each pixel point and a target world coordinate of a corresponding initial target voxel, a first transformation relationship of the camera coordinate system relative to the world coordinate system is determined.

In some embodiments, an electronic device can establish an error function according to the camera coordinate of each pixel point and a target world coordinate of a corresponding initial target voxel, and then solve the current optimal first transformation relationship by the least square method. For example, a set of camera coordinates including n pixel points is represented as P={$p_1, p_2, \ldots, p_i, \ldots, p_n$} wherein the camera coordinates of the pixel points are represented by $p_i$; a set of target world coordinates of initial target voxels matching with the n pixel points is represented as Q={$q_1, q_2, \ldots, q_i, \ldots, q_n$} wherein the target world coordinates of the initial target voxels are represented by $q_i$; thus, the following formula (3) can be listed:

$$E(R, T) = \frac{1}{n}\sum_{i=1}^{n}\|q_i - (Rp_i + T)\|^2 \qquad (3)$$

In this formula, E(R, T) is an error function, and R and T are respectively a rotation matrix and a translation vector in a first transformation relationship to be solved. Thus, the optimum solutions of R and T in the formula (3) can be solved through the least square method.

Operation S304, according to the first transformation relationship, the camera coordinate of each pixel point, and the target world coordinates of the corresponding initial target voxels, a matching error is determined.

In some embodiments, the matching error refers to an overall matching error, that is, a matching error of all pixel points. After obtaining the optimal solution, that is, the first transformation relationship, the camera coordinate of each pixel point can be transformed into a corresponding second world coordinate according to the first transformation relationship. If the initial target voxel and the pixel point selected in the operation S302 represent the same location point or two similar location points in an actual physical space, the second world coordinate of the pixel point should be identical or similar to the target world coordinate of the corresponding initial target voxel. Conversely, if the two represent neither the same location point nor two similar location points, the second world coordinate of the pixel point is different from the target world coordinate of the corresponding initial target voxel and is not similar either. Based on this, the matching error can be determined through the following operations S406 and S407, so that based on the matching error and a preset threshold value, it is determined whether the initial target voxel is a point that actually matches with the pixel point, and then the target transformation relationship is determined.

Operation S305, if the matching error is larger than a preset threshold value, it is returned to the operation S302, the initial target voxel is re-selected, and the matching error is re-determined.

Understandably, if the matching error is larger than the preset threshold value, it indicates that the currently selected initial target voxel is not a voxel matching with the pixel point, the two represent neither the same location point nor two similar location points in a physical space. At this time, it is required to return the operation S302 to re-select the initial target voxel, and re-execute the operations S303 to S304 base on the re-selected initial target voxel to re-determine the matching error; until the re-determined matching error is less than the preset threshold, it is considered that the initial target voxel selected in the current iteration is a point that really matches with the pixel point; at this time, the first transformation relationship obtained in the current iteration can be determined as the target transformation relationship.

Conversely, in some embodiments, if the matching error is less than or equal to the preset threshold value, a positioning result of the image acquisition module in the point cloud map is determined according to a second transformation relationship obtained in the current iteration.

Operation S306, a re-determined first transformation relationship of which the matching error is less than or equal to the preset threshold value is determined as a target transformation relationship.

Operation S307, a positioning result of the image acquisition module is determined according to the target transformation relationship.

An embodiment of the present application further provides a positioning method, the method can include the following operations S401 to S410.

Operation S401, according to an intrinsic parameter matrix of an image acquisition module and depth values of multiple pixel points in a depth image captured by the image acquisition module, pixel coordinates of the multiple pixel points are converted into camera coordinates.

Operation S402, a second transformation relationship of a camera coordinate system relative to a world coordinate system is acquired.

In some embodiments, an electronic device can set an initial value for a rotation matrix and a translation vector in the second transformation relationship, that is, set an initial value of the second transformation relationship.

Operation S403, according to the second transformation relationship and a camera coordinate of a jth pixel point in the depth image, a first world coordinate of the jth pixel point is determined, wherein j is an integer being larger than 0.

Operation S404, a first world coordinate of each pixel point is matched with target world coordinates of the multiple voxels to obtain corresponding initial target voxels.

In some embodiments, an electronic device can determine a distance between a first world coordinate of a pixel point and a target world coordinate of each voxel, and determine a voxel being the closest to the pixel point as an initial target voxel, or determine a voxel of which the distance is less than or equal to a distance threshold value as an initial target voxel. In some embodiments, an electronic device can determine a Euclidean distance between a first world coordinate of a pixel point and a target world coordinate of each voxel, and take the Euclidean distance as a distance between the pixel point and the voxel.

Operation S405, according to a camera coordinate of each pixel point and a target world coordinate of a corresponding initial target voxel, a first transformation relationship between the camera coordinate system relative to the world coordinate system is determined.

Operation S406, according to the first transformation relationship and the camera coordinate of the jth pixel point in the depth image, a second world coordinate of the jth pixel point is determined, wherein j is an integer being larger than 0.

Operation S407, according to the second world coordinate of each pixel point and the target world coordinate of the corresponding initial target voxel, a matching error is determined.

In some embodiments, an electronic device can first determine a distance (e.g., a Euclidean distance) between the second world coordinate of each pixel point and the target world coordinate of the corresponding initial target voxel; thus, according to each of these distances, the matching error is determined.

In some embodiments, it is possible to determine an average distance between multiple pixel points and matched initial target voxels as the matching error. For example, a set of second world coordinates including n pixel points is represented as $P'=\{p'_1, p'_2, \ldots, p'_i, \ldots, p'_n\}$, wherein the second world coordinates of the pixel points are represented by $p'_i$; and a set of target world coordinates of initial target voxels matching with the n pixel points is represented as $Q=\{q_1, q_2, \ldots, q_i, \ldots, q_n\}$, wherein the target world coordinates of the initial target voxels are represented by $q_i$; thus, by the following formula (4), the matching error d can be obtained:

$$d = \frac{1}{n}\sum_{i=1}^{n}\|p'_i - q_i\|^2 \qquad (4)$$

In this formula, $\|p'_i - q_i\|^2$ represents a Euclidean distance between a pixel point and a matched initial target voxel.

Operation S408, if the matching error is larger than a preset threshold value, the first transformation relationship is used as the second transformation relationship, the initial target voxels are re-selected, and the matching error is re-determined, until the re-determined matching error is less than the preset threshold value, and then an operation S409 is entered.

Understandably, if the matching error is larger than the preset threshold value, it means that the acquired second transformation relationship does not conform to reality. In other words, the obtained initial target voxel is not a voxel that really matches with the pixel point. At this time, the currently determined first transformation relationship can be used as the second transformation relationship, and then the operations S403 to S407 are re-executed; until the matching error is less than the threshold value, the initial target voxel selected at this time may be the voxel that matches with the pixel point, that is, the two correspond to the same position point in the physical space.

Operation S409, a re-determined first transformation relationship of which a matching error is less than or equal to the preset threshold value is determined as a target transformation relationship.

Operation S410, according to the target transformation relationship, a positioning result of the image acquisition module is determined.

Figure 2:
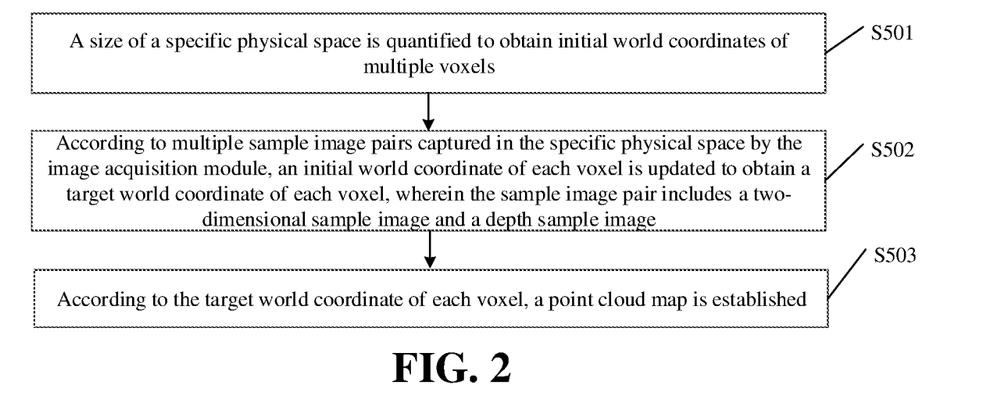
FIG. 2 is a schematic diagram of a process of constructing a point cloud map according to an embodiment of the present application.

A positioning method provided by an embodiment of the present application relies on a pre-established point cloud map. The pre-established point cloud map is usually stored in the electronic device or stored in other electronic device (such as servers). The electronic device, when implementing the positioning method, only needs to load a locally stored point cloud map or request other electronic device to obtain the map; wherein, a construction process for the point cloud map is as shown in FIG. 2 and can include the following operation S501 to S503.

Operation S501, a size of a specific physical space is quantified to obtain initial world coordinates of multiple voxels.

Figure 3:
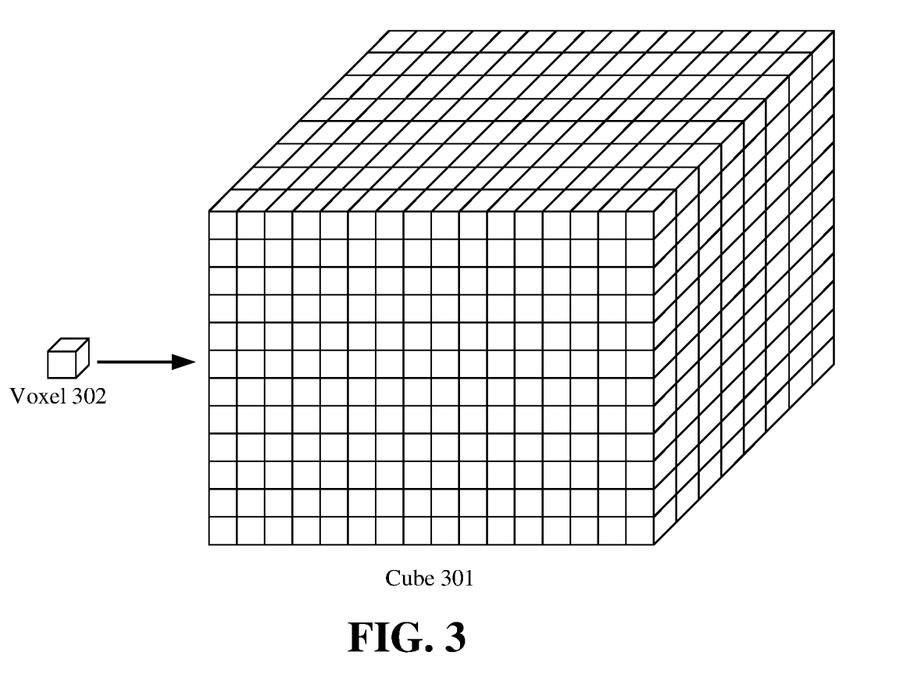
FIG. 3 is a schematic diagram of implementation of quantifying a specific physical space according to an embodiment of the present application.

Understandably, the specific physical space refers to a physical scene covered by the point cloud map, for example, the specific physical space is a certain building, a large airport, a shopping mall, a certain city, etc. A voxel is actually the smallest unit in the specific physical space. As shown in FIG. 3, the specific physical space is regarded as a cube 301 with a certain size, and then the cube is meshed with a voxel 302 as a unit to obtain multiple voxels; and a world coordinate system is taken as a reference coordinate system, an initial world coordinate system of each voxel is determined. For example, if a size of a specific physical space is $512 \times 512 \times 512$ m$^3$, and a size of a voxel is $1 \times 1 \times 1$ m$^3$, then the voxel with the size of $1 \times 1 \times 1$ m$^3$ is used as a unit to quantify the physical space with the size of $512 \times 512 \times 512$ m$^3$, and initial world coordinates of $512 \times 512 \times 512$ voxels can be obtained. In some embodiments, a quantization process includes quantizing a size of a specific physical space and determining initial world coordinates of each voxel.

Of course, in embodiments of the present application, quantization units, that is, sizes of voxels, is not limited. In practical applications, sizes of voxels can be designed according to engineering requirements.

Operation S502, according to multiple sample image pairs captured in the specific physical space by the image acquisition module, an initial world coordinate of each voxel is updated to obtain a target world coordinate of each voxel, wherein the sample image pair includes a two-dimensional sample image and a depth sample image.

The two-dimensional sample image can be a planar image that contains no depth information, for example, the two-dimensional sample image is an RGB image. In some embodiments, an electronic device can capture the two-dimensional sample image through a first camera module of the image acquisition module. The depth sample image refers to an image containing depth information. In some embodiments, the electronic device can capture the depth sample image through a second camera module (for example, a two-eyed camera or the like) in the image acquisition module. The electronic device can implement the operation S502 through the operations S602 to S604 in the following embodiment.

Operation S503, according to the target world coordinate of each voxel, a point cloud map is established. That is, the point cloud map includes the target world coordinate of each voxel.

Understandably, when the image acquisition module captures sample images at different time or at different locations, there are overlapping areas in shooting scenes. That is, different sample images include some identical image content, which results in that a large amount of redundant information is introduced when constructing a point cloud map based on these sample images, the same location point in a physical space may be expressed in the point cloud map with the same or similar world coordinates by multiple pixel points, such that data amount of the point cloud map is greatly increased and positioning speed is affected. Obviously, this kind of point cloud map with a large amount of redundant information is inconvenient for obtaining high-precision positioning results in visual positioning.

In view of this, in this embodiment of the present application, the point cloud map is constructed in the form of voxels, that is, the initial world coordinate of each voxel is updated (that is, corrected, optimized) through multiple captured sample image pairs, and thus a point cloud map including the target world coordinate of each voxel is obtained. This method of constructing a point cloud map is equivalent to fusing world coordinates of all pixel points covered by a voxel into a world coordinate value; in this way, the above problem that the same position point in a physical space is expressed in the point cloud map with the same or similar world coordinates by multiple pixel points is solved, and a large amount of redundant information is removed. In application of visual positioning, based on the point cloud map obtained through this embodiment of the present application, on the one hand, a positioning speed can be improved, so that a positioning service has better real-time performance; and on the other hand, positioning accuracy of visual positioning can be improved.

In some embodiments, it is possible to acquire higher positioning accuracy by reducing sizes of voxels. Theoretically, the less the sizes of voxels, the higher the acquired positioning accuracy.

An embodiment of the present application further provides a process of constructing a point cloud map, this process can include the following operations S601 to S605.

Operation S601, a size of a specific physical space is quantified to obtain initial world coordinates of multiple voxels.

Operation S602, an image acquisition module is controlled to capture sample image pairs according to a preset frame rate.

In some embodiments, the image acquisition module can capture sample image pairs while moving. For example, collection of sample image pairs can be realized by a robot having the image acquisition module. For another example, a data collection personnel can carry the image acquisition module to capture images while walking.

Operation S603, according to a first sample image pair captured at a current moment and a second sample image pair captured at a historical moment by the image acquisition module, an initial world coordinate of each voxel is updated.

In some embodiments, an electronic device can implement the operation S603 through operations S703 to S705 in the following embodiment.

Operation S604, according to the first sample image pair and a third sample image pair captured at a next moment by the image acquisition module, a current world coordinate of each voxel is continuously updated; until collection of sample images ends, a current world coordinate of each voxel is taken as a target world coordinate corresponding to the voxel.

Understandably, in the operation S604, in the continuously updating a current world coordinate of each voxel, what is updated is the target world coordinate of each voxel obtained by updating in the operation S603. In fact, through the operation S603 and the operation S604, an electronic device can update a current world coordinates of each voxel in real time according to the sample image pair captured at the current moment and the sample image pair captured at the historical moment by the image acquisition module, until the image acquisition task of the image acquisition module ends, and a target world coordinate of each voxel obtained by the current updating is used as a target world coordinate corresponding to the voxel.

Operation S605, according to the target world coordinate of each voxel, a point cloud map is constructed.

In this embodiment of the present application, while capturing sample image pairs, the current world coordinate of each voxel is updated by using the captured sample image pairs. That is, an electronic device continuously uses sample image pairs captured at the current moment and sample image pairs captured at historical moments (for example, the previous moment) by the image acquisition module to update the current world coordinate of each voxel. Since two sample images obtained at previous and next moments have more overlapping areas, the electronic device does not need to find the two sample image pairs with the most overlapping areas from multiple sample image pairs and then update the current world coordinate of each voxel based on the two sample image pairs; in this way, efficiency of map construction can be greatly improved.

An embodiment of the present application further provides a process of constructing a point cloud map, the process includes at least the following operations S701 to S707.

Operation S701, a size of a specific physical space is quantified to obtain initial world coordinates of multiple voxels.

Operation S702, an image acquisition module is controlled to capture sample image pairs according to a preset frame rate.

Operation S703, according to a first sample image pair captured at a current moment and a second sample image pair captured at a historical moment by the image acquisition module, a current camera coordinate of each voxel is determined.

In some embodiments, an electronic device can determine a current transformation relationship of a camera coordinate system relative to a world coordinate system according to the first sample image pair and the second sample image pair, and then converts an initial world coordinate of each voxel into a current camera coordinate according to the current transformation relationship.

In some embodiments, an electronic device can determine the current transformation relationship according to image features of pixel points of a two-dimensional sample image in the first sample image pair, depth values of pixel points of a depth sample image in the first sample image pair, image features of pixel points of a two-dimensional sample image in the second sample image pair, and depth values of pixel points of a depth sample image in the second sample image pair. Based on this, an initial world coordinate of a voxel is converted into a current camera coordinate according to the following formula (5).

$$\begin{bmatrix} x_c \\ y_c \\ z_c \\ 1 \end{bmatrix} = [R \ T] \begin{bmatrix} x_w \\ y_w \\ z_w \\ 1 \end{bmatrix} \quad (5)$$

In this formula, $(x_c, y_c, z_c)$ represents the camera coordinate, the transformation relationship includes a rotation matrix R and a translation vector T, and $(x_w, y_w, z_w)$ represents a world coordinate.

Operation S704, from the depth sample image in the first sample image pair, a depth value corresponding to a current pixel coordinate of each voxel is acquired.

In some embodiments, an electronic device can convert a current camera coordinate of each voxel into a current pixel coordinate according to an intrinsic parameter matrix of the image acquisition module, and acquire a depth value corresponding to a current pixel coordinate of each voxel from the depth sample image in the first sample image pair.

Operation S705, according to a current camera coordinate of each voxel and a depth value corresponding to a current pixel coordinate of each voxel, an initial world coordinate corresponding to the voxel is updated.

In some embodiments, an electronic device can acquire a historical distance from each voxel to a surface of an object, and input a Z axis coordinate value of a current camera coordinate of each voxel, a depth value corresponding to a current pixel coordinate of each voxel, and the historical distance from each voxel to the surface of the object into a distance model corresponding to the voxel to update the historical distance and obtain a target distance; and the target distance from each voxel to the surface of the object is updated into a Z axis coordinate value in an initial world coordinate corresponding to the voxel, so as to realize updating of the initial world coordinate corresponding to the voxel. In some embodiments, the distance model corresponding to the voxel is as the following formula (6):

$$\begin{cases} W_t = \min(\text{max weight}, W_{t-1} + 1) \\ sdf_t = D_t(u, v) - z_c \\ d_t = \begin{cases} \min(1, sdf_t/\text{max truncation}), & sdf_t > 0 \\ \max(-1, sdf_t/\text{max truncation}), & sdf_f < 0 \end{cases} \\ D_t = \dfrac{W_{t-1} \times D_{t-1} + W_t \times d_t}{W_{t-1} + W_f} \end{cases} \quad (6)$$

In this formula, $W_t$ represents a weight of a voxel t at the current moment; $Wt_{t-1}$ represents a weight of a voxel t-1 at a previous moment; max weight is the greatest weight in t-1 voxels at the previous moment; $D_t$ represents a depth value corresponding to a current pixel coordinate of a voxel; $z_c$ represents a Z axis coordinate value of a current camera coordinate of the voxel; max truncation and min truncation respectively represent a maximum value and a minimum value of a truncated range; $D_{t-1}$ represents a distance from the voxel to a surface of an object determined at the previous moment t-1 (i.e., an example of the historical distance), and $D_t$ is a target distance from the voxel to the surface of the object that is currently to be obtained.

Thus, the Z axis coordinate value $z_c$ of the current camera coordinate of the voxel, the depth value $D_t$ corresponding to the current pixel coordinate of the voxel, and the historical distance from the voxel to the surface of the object are input into the distance model as shown in the formula (6), the target distance from the voxel to the surface of the object can be obtained.

Understandably, when updating the initial world coordinate corresponding to the voxel, the historical distance from the voxel to the surface of the object is considered; in this way, the updated initial world coordinate of the voxel is smoother, so that the finally obtained target world coordinate of the voxel is more accurate, and thus positioning accuracy can be improved in the positioning stage.

Operation S706, according to the first sample image pair and a third sample image pair captured at a next moment by the image acquisition module, a current world coordinate of each voxel is continuously updated; until collection of sample images ends, a current world coordinate of the voxel is taken as a target world coordinate.

Understandably, an electronic device, by executing such as the operations S703 to S705, continuously updates the current world coordinate of each voxel.

Operation S707, according to the target world coordinate of each voxel, a point cloud map is constructed.

An embodiment of the present application further provides a process of constructing a point cloud map, the process includes at least the following operations S801 to S811.

Operation S801, a size of a specific physical space is quantified to obtain initial world coordinates of multiple voxels.

Operation S802, an image acquisition module is controlled to capture sample image pairs according to a preset frame rate.

Operation S803, according to a first sample image pair captured at a current moment and a second sample image pair captured at a historical moment by the image acquisition module, a current transformation relationship of a camera coordinate system relative to a world coordinate system is determined.

Operation S804, according to the current transformation relationship, an initial world coordinate of each voxel is converted into a current camera coordinate.

Operation S805, according to an intrinsic parameter matrix of the image acquisition module, a current camera coordinate of each voxel is converted into a current pixel coordinate.

Operation S806, a depth value corresponding to a current pixel coordinate of each voxel is acquired from a depth sample image in the first sample image pair.

Operation S807, a historical distance from each voxel to a surface of an object is acquired.

Operation S808, a Z axis coordinate value of a current camera coordinate of each voxel, a depth value corresponding to a current pixel coordinate of each voxel, and a historical distance from each voxel to the surface of the object are input into a distance model corresponding to the voxel to update the historical distance and obtain a target distance.

Operation S809, a target distance of each voxel is updated into a Z axis coordinate value in an initial world coordinate corresponding to the voxel, so as to realize updating of the initial world coordinate corresponding to the voxel.

Operation S810, according to the first sample image pair and a third sample image pair captured at a next moment by the image acquisition module, a current world coordinate of each voxel is continuously updated; until collection of sample images ends, a current world coordinate of the voxel is taken as a target world coordinate.

Understandably, an electronic device, by executing such as the operations S803 to S810, continuously updates the current world coordinate of each voxel.

Operation S811, according to the target world coordinate of each voxel, a point cloud map is constructed.

By visual information, an indoor environment map can be established to help users quickly locate their own locations and surrounding environments. For visual technology, in related technologies, a method is identifying a person and a background in an image captured by a camera to determine a position of the person. This solution matches a background with a predetermined indoor map of a building, determines a corresponding position of the background indoors, and then determines a position of a person indoors according to the position of the background. In terms of a specific algorithm flow for determining the position of the person, an overall idea of the solution is as follows. An object in a fixed position in a background of an image is recognized by an image recognition method, and according to a relative position relationship of the object in the fixed position, a position of a person at a certain moment is determined. Core technical points of the solution are: 1. performing indoor environment mapping through visual images; 2. image matching; 3. recognizing persons and objects in images.

However, the above related technologies have the following defects: 1. the technology only considers two-dimensional image features of visual images, posture information of persons cannot be obtained after positioning, and positioning accuracy is low; 2. the technology can perform location aiming at a person or a fixed objects in an image, but the premise is that there must be a recognizable person or a fixed object in the image, otherwise positioning will be invalid, thus positioning reliability is low; 3. this technology cannot cope with positioning needs of scenes with changing light, such as positioning under different conditions during day and night, positioning robustness is poor.

Based on this, an exemplary application of an embodiment of the present application in an actual application scenario will be described below.

An embodiment of the present application implements an indoor environment reconstruction and positioning technology based on dense point clouds, which can help users create an indoor map in the form of dense point clouds (that is, an example of a point cloud map), and locate users' positions in real time. This solution can extract image features for visual tracking and motion estimation aiming at indoor scenes, and construct dense maps; the positioning process does not depend on external base station equipment, positioning accuracy is high, and robustness is strong. The solution includes two main parts: constructing a map and visual positioning.

In this embodiment of the present application, the map construction part is mainly to collect RGB image information through a monocular camera in the image acquisition module, extract image features for visual tracking, and at the same time, use a three-dimensional visual sensor in the image acquisition module (such as TOF, structure light, etc.) to collect depth information to construct a dense point cloud map (i.e., an example of a point cloud map). Specific technical operations include at least the following operations S11 to S17.

Operation S11, using a monocular camera to perform RGB image acquisition in a fixed frame rate.

Operation S12, using a three-dimensional visual sensor to perform depth image acquisition in a fixed frame rate.

Operation S13, the RGB image is aligned with the depth image, the alignment includes time stamp alignment and pixel alignment.

Operation S14, during the acquisition process, feature information in the RGB image and depth information in the depth image are extracted in real time, so as to perform visual tracking and motion estimation for the image acquisition module and determine a current transformation relationship of a camera coordinate system relative to a world coordinate system.

Operation S15, a dense point cloud is obtained through the depth image and an intrinsic parameter matrix of a camera, wherein the denes point cloud includes a camera coordinate of each pixel point.

It should be noted that the so-called dense point cloud is relative to a sparse point cloud. The number of sampling points in the dense point cloud is far greater than the number of sampling points in the sparse point cloud.

Operation S16, the dense point cloud is fused in the form of voxels using TSDF algorithm.

Operation S17, a fused dense point cloud is stored, and it is serialized and stored locally as a dense point cloud map.

Regarding the depth image acquisition using the three-dimensional visual sensor in the operation S12, the following explanation is given here. A depth image is also called as a distance image, which refers to an image in which a distance from the image acquisition module to each point in a shooting scene is used as a pixel value. A depth image intuitively reflects a geometric shape of a visible surface of an object. In a image frame provided by a depth data stream, each pixel point represents a distance from an object at a specific coordinate to a camera plane in a view field of a three-dimensional visual sensor.

Regarding the obtaining the dense point cloud through the depth image and the intrinsic parameter matrix of the camera mentioned in the operation S15, the following explanation is given here. It is possible to convert a pixel point (u, v) into camera coordinates ($x_c$, $y_c$, $z_c$) through the following formula (7).

$$z_c \begin{pmatrix} u \\ v \\ 1 \end{pmatrix} = \begin{bmatrix} \frac{f}{dx} & 0 & u_0 \\ 0 & \frac{f}{dy} & v_0 \\ 0 & 0 & 1 \end{bmatrix} \begin{bmatrix} x_c \\ y_c \\ z_c \\ 1 \end{bmatrix} \quad (7)$$

In this formula, ($u_0$, $v_0$) are pixel coordinates of a central point of an image, $z_c$, represents a z axis value of a camera coordinate, that is, a depth value corresponding to the pixel point;

$$\frac{f}{dx}$$

represents a focal distance component of a focal distance $f$ on an x axis of a camera coordinate system;

$$\frac{f}{dy}$$

represents a focal distance component of the focal distance $f$ on a y axis of the camera coordinate system. It needs to be noted that since a Z axis of the camera coordinate system is an optical axis of a lens, a depth value of the pixel point (u, v) is just the Z axis coordinate value $z_c$, of a camera coordinate of the pixel point. The same object in the camera coordinate and the world coordinate has the same depth, that is, $z_c = z_w$.

Regarding the fusing the dense point cloud in the form of voxels using TSDF algorithm in the operation S16, the following technical operations S161 to S164 are given here.

Operation S161, first, a coordinate $V^g$(x, y, z) of a voxel in a global coordinate system (i.e., a target world coordinate of the voxel) is acquired, and then according to a transformation matrix obtained by motion tracking (i.e., the current transformation relationship output in the operation S14), it is converted from a global coordinate into a camera coordinate V(x, y, z).

Operation S162, according to an intrinsic parameter matrix of a camera, the camera coordinate V(x, y, z) is converted into an image coordinate, so as to obtain an image coordinate (u, v).

Operation S163, if a depth value D(u, v) of a lth frame of depth image at the image coordinate (u, v) is not 0, a size of D(u, v) is compared with that of z of the camera coordinate V(x, y, z) of the voxel; if D(u, v)<z, it indicates that the voxel is farther away from the camera and is inside a fused surface; otherwise, it indicates that the voxel is closer to the camera and is outside of the fused surface.

Operation S164, according to a result of the operation S163, a distance $D_l$ and a weight value $W_l$ in the voxel are updated; an updating formula is as shown in the following formula (8).

$$\begin{cases} W_l(x, y, z) = \min(\text{max weight}, W_{l-1}(x, y, z) + 1) \\ D_l(x, y, z) = \frac{W_{l-1}(x, y, z)D_{l-1}(x, y, z) + W_l(x, y, z)d_l(x, y, z)}{W_{l-1}(x, y, z) + W_l(x, y, z)} \\ sdf_l = D_l(u, v) - z \\ d_l(x, y, z) = \begin{cases} \min(1, sdf_l/\text{max truncation}) sdf_l > 0 \\ \max(-1, sdf_l/\text{min truncation}) sdf_l < 0 \end{cases} \end{cases} \quad (8)$$

In this formula, $W_l$(x, y, z) is a weight of a voxel in a global data cube of a current frame, $W_{l-1}$(x, y, z) is a weight of a voxel in a global data cube of a previous frame, max weight is the greatest weight in weights of all voxels in the global data cube of the previous frame and can be set to be 1, $D_l$(x, y, z) is a distance from a voxel in the global data cube of the current frame to a surface of an object, $D_{l-1}$(x, y, z) is a distance from a voxel in the global data cube of the previous frame to the surface of the object, $d_l$(x, y, z) is a distance from a voxel in a global data cube to the surface of the object obtained by calculation according to depth data of the current frame, z represents a z axis coordinate of a voxel in a camera coordinate system, $D_l$(u, v) represents a depth value of a depth image of the current frame at the pixel point (u, v), and [min truncation, max truncation] is a truncated range, which will affect a degree of refinement of reconstruction results.

Based on the operations S11 to S17, a dense point cloud map based on a dense point cloud (i.e., an example of a point cloud map) can be constructed, the map stores the dense point cloud map in a binary format to the local; during a visual positioning process, the map will be loaded and used.

In this embodiment of the present application, the visual positioning part collects depth information and converts it into a point cloud by using a three-dimensional visual sensor, and then matches a dense point cloud map through an iterative closest point (ICP) algorithm to obtain a position and a posture of a current camera in the map and thereby achieve the purpose of positioning. Specific technical operations can include at least the following operations S21 to S24.

Operation S21, a constructed dense point cloud map is loaded.

Operation S22, depth image acquisition is performed by a three-dimensional visual sensor to obtain a depth image to be processed.

Operation S23, a current point cloud is obtained through the depth image and an intrinsic parameter matrix of a camera, wherein the current point cloud includes camera coordinates of pixel points of the depth image.

Operation S24, the current point cloud and the dense point cloud map are matched through an ICP algorithm to obtain an accurate position and posture of a current camera in a map.

Regarding the method of obtaining a current point cloud through the depth image and an intrinsic parameter matrix of a camera in the operation S23, the operation S15 can be referred to.

Regarding the matching the current point cloud and the dense point cloud map through an ICP algorithm to obtain an accurate position and posture of a current camera in a map in the operation S24, the following explanation is given here. The ICP algorithm is essentially an optimal registration method based on the least squares method. The algorithm repeatedly selects corresponding related point pairs, and calculates the optimal rigid body transformation, until convergence accuracy requirements for correct registration are met. The basic principle of the ICP algorithm is: in a target point cloud P and a source point cloud Q to be matched, respectively, according to certain constraint conditions, the nearest point ($p_i$, $q_i$) is found, and then the optimal rotation R and translation T are calculated, so that an error function is the smallest. The error function E(R, T) is as a formula (9):

$$E(R, T) = \frac{1}{n}\sum_{i=1}^{n}\|q_i - (Rp_i + T)\|^2 \qquad (9)$$

In this formula, $r_i$, is the number of adjacent point pairs, $p_i$ is a point in the target point cloud P, $q_i$ is the nearest point in the source point cloud Q corresponding to $p_i$, R is a rotation matrix, and T is a translation vector. The algorithm includes the following operations S241 to S246.

Operation S241, a point set $p_i \in P$ is taken in a current point cloud P.

Operation S242, a corresponding point set $q_i \in Q$ in a dense point cloud map Q is found, such that $\|q_i - p_i\| = \min$;

Operation S243, a rotation matrix R and a translation matrix T are calculated such that an error function is minimum;

Operation S244, using the rotation matrix R and the translation matrix T obtained by the operation S243, rotation and translation transformation are performed for $p_i$, and a new corresponding point set $p_i' = \{p_i' = Rp_i + T, p_i \in P\}$ is obtained.

Operation S245, an average distance between $p_i$ and a corresponding point set $q_i$ is calculated:

$$d = \frac{1}{n}\sum_{i=1}^{n}\|p_i' - q_i\|^2.$$

Operation 246, if d is less than a given threshold value $d_{TH}$ or greater than a preset number of iteration times, iteration calculation is stopped; the algorithm outputs a current rotation matrix R and translation matrix T; otherwise, it is skipped to the operation S242.

In this embodiment of the present application, based on the operations S21 to S24, it is possible to achieve the positioning purpose in a predefined dense point cloud map through depth information provided by a three-dimensional visual sensor, and obtain a position and posture of the image acquisition module in a map coordinate system. The positioning result has high accuracy, does not need to rely on external base station equipment, has strong resistance to environmental interference and strong robustness.

The positioning method provided by this embodiment of the present application can obtain the following technical effects: 1. depth information can be obtained by a three-dimensional visual sensor, so that the depth information is used to realize map construction and positioning; in this way, the positioning accuracy will not be affected by illumination change conditions, robustness of the positioning method is high; 2. both a position and a posture can be provided in the positioning results, which improves the positioning accuracy compared with other indoor positioning methods; 3. the positioning method does not need to introduce algorithms with higher error rates such as object recognition, the positioning success rate is high, and the robustness is strong; 4. the constructed map is in the form of a dense point cloud map, which does not need to store RGB information of environments, so privacy of the map is better.

In this embodiment of the present application, a three-dimensional visual sensor is used to collect depth information to construct a dense point cloud map, and a high-precision and high-robust point cloud matching algorithm is combined to perform indoor environment positioning. In terms of map construction, the embodiment of the present application collects depth image information by the three-dimensional visual sensor, and store it as a dense point cloud map in the form of a dense point cloud. In terms of the positioning method, the embodiment of the present application uses the ICP algorithm to match the current point cloud and the map dense point cloud, and accurately calculates the current position and posture. The combination of the two forms a set of high-precision and high-robust indoor positioning method.

Based on the foregoing embodiments, an embodiment of the present application provides a positioning device, this device includes each module included and each unit included in each module, and can be implemented by a processor in an electronic device; of course, it can also be implemented by specific logic circuits. In an implementation process, the processor can be a central processing unit (CPU), a microprocessor (MPU), a digital signal processor (DSP), a field programmable gate array (FPGA), or the like.

Figure 4A:
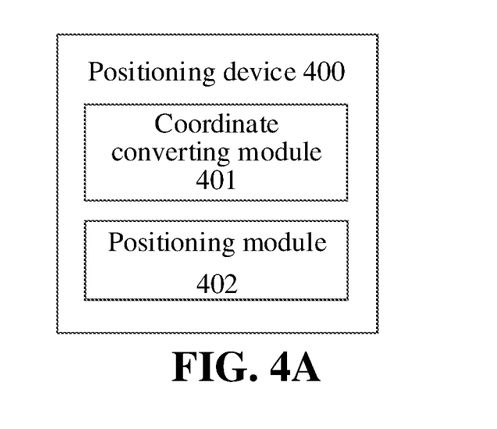
FIG. 4A is a schematic diagram of a constitution structure of a positioning device according to an embodiment of the present application.

FIG. 4A is a schematic diagram of a constitution structure of a positioning device according to an embodiment of the present application. As shown in FIG. 4A, the device 400 includes a coordinate converting module 401 and a positioning module 402, wherein the coordinate converting module 401 is configured to: according to an intrinsic parameter matrix of an image acquisition module and depth values of multiple pixel points in a depth image captured by the image acquisition module, convert pixel coordinates of the multiple pixel points into camera coordinates; and the positioning module 402 is configured to match a camera coordinate of each pixel point with target world coordinates of multiple voxels in a pre-established point cloud map and obtain a positioning result of the image acquisition module; wherein the target world coordinate of each voxel is obtained by updating an initial world coordinate of each voxel according to multiple sample image pairs, and the sample image pair comprises a two-dimensional sample image and a depth sample image.

Figure 4B:
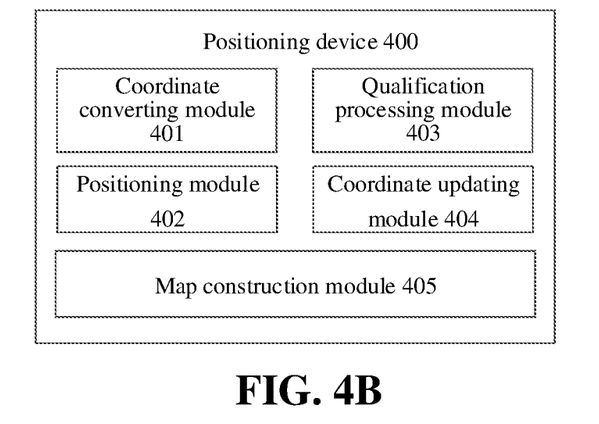
FIG. 4B is a schematic diagram of a constitution structure of another positioning device according to an embodiment of the present application.

In some embodiments, as shown in FIG. 4B, the device 400 further includes a quantification processing module 403, a coordinate updating module 404, and a map construction module 405; wherein the quantification processing module 403 is configured to quantify a size of a specific physical space to obtain initial world coordinates of multiple voxels; the coordinate updating module 404 is configured to: according to multiple sample image pairs captured in the specific physical space by the image acquisition module, update an initial world coordinate of each voxel to obtain a target world coordinate of each voxel, wherein the sample image pair includes a two-dimensional sample image and a depth sample image; and the map construction module 405 is configured to: according to the target world coordinate of each voxel, establish a point cloud map.

In some embodiments, the coordinate updating module 404 includes: a controlling submodule configured to control the image acquisition module to capture sample image pairs according to a preset frame rate; and a coordinate updating submodule configured to: according to a first sample image pair captured at a current moment and a second sample image pair captured at a historical moment by the image acquisition module, update an initial world coordinate of each voxel; and according to the first sample image pair and a third sample image pair captured at a next moment by the image acquisition module, continuously update a current world coordinate of each voxel, until collection of sample images ends, take a current world coordinate of each voxel as a target world coordinate.

In some embodiments, the coordinate updating submodule includes: a camera coordinate determining unit configured to: according to the first sample image pair and the second sample image pair, determine a current camera coordinate of each voxel; a depth value acquiring unit configured to: from the depth sample image in the first sample image pair, acquire a depth value corresponding to a current pixel coordinate of each voxel; and a coordinate updating unit configured to: according to a current camera coordinate of each voxel and a depth value corresponding to a current pixel coordinate of each voxel, update an initial world coordinate corresponding to the voxel; and according to the first sample image pair and a third sample image pair captured at a next moment by the image acquisition module, continuously update a current world coordinate of each voxel, until collection of sample images ends, take a current world coordinate of the voxel as a target world coordinate.

In some embodiments, the coordinate updating unit is configured to: acquire a historical distance from each voxel to a surface of an object; input a Z axis coordinate value of a current camera coordinate of each voxel, a depth value corresponding to a current pixel coordinate of each voxel, and a historical distance from each voxel to the surface of the object into a distance model corresponding to the voxel to update the historical distance and obtain a target distance; update a target distance from each voxel to the surface of the object into a Z axis coordinate value in an initial world coordinate corresponding to the voxel, so as to realize updating of the initial world coordinate corresponding to the voxel; and according to the first sample image pair and the third sample image pair captured at the next moment by the image acquisition module, continuously update a current world coordinate of each voxel, until collection of sample images ends, take a current world coordinate of the voxel as a target world coordinate.

In some embodiments, the camera coordinate determining unit is configured to: according to the first sample image pair and the second sample image pair, determine a current transformation relationship of a camera coordinate system relative to a world coordinate system; and according to the current transformation relationship, convert an initial world coordinate of each voxel into a current camera coordinate.

In some embodiments, the depth value acquiring unit is configured to: according to an intrinsic parameter matrix of the image acquisition module, convert a current camera coordinate of each voxel into a current pixel coordinate; and obtain a depth value corresponding to the current pixel coordinate of each voxel from the depth sample image in the first sample image pair.

In some embodiment, the positioning module 402 includes: an iterating submodule configured to: according to an iteration strategy, match a camera coordinate of each pixel point with target world coordinates of the multiple voxels, and obtain a target transformation relationship of a camera coordinate system relative to a world coordinate system; and a positioning submodule configured to: according to the target transformation relationship, determine a positioning result of the image acquisition module.

In some embodiments, the iterating submodule includes: a selecting unit configured to select an initial target voxel matching with each pixel point from the multiple voxels; and a determining unit configured to: according to a camera coordinate of each pixel point and a target world coordinate of a corresponding initial target voxel, determine a first transformation relationship of the camera coordinate system relative to the world coordinate system; according to the first transformation relationship, the camera coordinate of each pixel point, and the target world coordinates of the corresponding initial target voxels, determine a matching error; if the matching error is larger than a preset threshold value, re-select the initial target voxel, and re-determine the matching error; and determine a re-determined first transformation relationship of which the matching error is less than or equal to the preset threshold value as a target transformation relationship.

In some embodiments, the selecting unit is configured to: acquire a second transformation relationship of a camera coordinate system relative to a world coordinate system; according to the second transformation relationship and a camera coordinate of a jth pixel point, determine a first world coordinate of the jth pixel point, wherein j is an integer being larger than 0; and match a first world coordinate of each pixel point with target world coordinates of the multiple voxels to obtain corresponding initial target voxels.

In some embodiments, the determining unit is configured to: according to the first transformation relationship and the camera coordinate of the jth pixel point, determine a second world coordinate of the jth pixel point, wherein j is an integer being larger than 0; and according to the second world coordinate of each pixel point and the target world coordinate of the corresponding initial target voxel, determine the matching error.

In some embodiments, the determining unit is configured to: determine a distance between the second world coordinate of each pixel point and the target world coordinate of the corresponding initial target voxel; and determine the matching error according to each of these distances.

In some embodiments, the selecting unit is configured to: if the matching error is larger than a preset threshold value, use the first transformation relationship as the second transformation relationship, and re-select the initial target voxels.

The description of the above device embodiments is similar to the description of the above method embodiments, and have similar beneficial effects as the method embodiments. For technical details not disclosed in the device embodiments of the present application, please refer to the description of the method embodiments of the present application for understanding.

It should be noted that, in the embodiments of the present application, if the above positioning method is implemented in the form of software function modules and sold or used as an independent product, it can also be stored in a computer-readable storage medium. Based on this understanding, technical solutions of the embodiments of the present application in essence, or a part that contributes to related technologies, can be embodied in the form of a software product. The computer software product is stored in a storage medium and includes a number of instructions to enable an electronic device (which may be a mobile phone, a tablet computer, a notebook computer, a desktop computer, a server, a robot, a drone, etc.) to execute the whole or a part of the method described in each embodiment of the present application. The aforementioned storage medium includes: a U-disk, a mobile hard disk, a read only memory (ROM), a magnetic disk, an optical disk, and other media that can store program codes. In this way, the embodiments of the present application are not limited to any specific combination of hardware and software.

Figure 5:
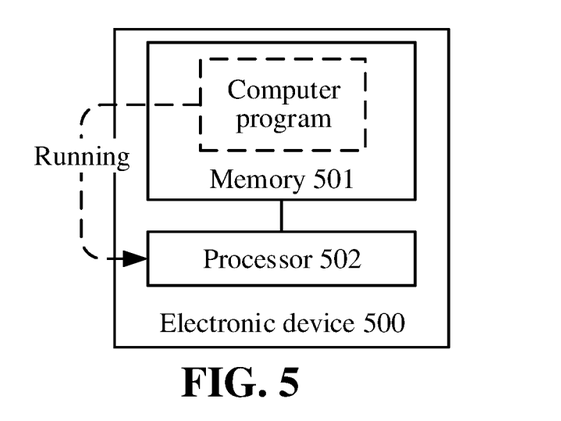
FIG. 5 is a schematic diagram of a hardware entity of an electronic device according to an embodiment of the present application.

Correspondingly, an embodiment of the present application provides an electronic device, FIG. 5 is a schematic diagram of a hardware entity of an electronic device according to an embodiment of the present application. As shown in FIG. 5, the hardware entity of the electronic device 500 includes a memory 501 and a processor 502, the memory 501 stores a computer program that can be run in the processor 502, and the processor 502, when executing the program, implements the operations of the positioning methods provided by the above embodiments.

The memory 501 is configured to store instructions and applications executable by the processor 502, and can also cache data to be processed or processed by the processor 502 and each module in the electronic device 500 (for example, image data, audio data, voice communication data, and video communication data), and can be realized through a flash memory (FLASH) or a random access memory (RAM).

Correspondingly, an embodiment of the present application provides a computer-readable storage medium, which stores a computer program, and the computer program, when being executed by a processor, implements operations of the positioning method provided by the above embodiments.

What needs to be pointed out here is that the description of the foregoing storage medium and device embodiments is similar to the description of the foregoing method embodiments, and has similar beneficial effects as the method embodiments. For technical details not disclosed in the storage medium and device embodiments of the present application, please refer to the description of the method embodiments of the present application for understanding.

It should be understood that "one embodiment" or "some embodiments" mentioned throughout the specification means that a specific feature, structure, or characteristic related to the embodiment is included in at least one embodiment of the present application. Therefore, the appearances of "in one embodiment" or "in some embodiments" in various places throughout the specification do not necessarily refer to the same embodiment. In addition, these specific features, structures, or characteristics can be combined in one or more embodiments in any suitable manner. It should be understood that, in the various embodiments of the present application, the sizes of the sequence numbers of the above processes does not mean the order of execution; the execution order of each process should be determined by its function and internal logic, and should not constitute any limitation to implementation processes of embodiments of the present application. The serial numbers of the foregoing embodiments of the present application are for description only, and do not represent superiority or inferiority of the embodiments.

The above description of the various embodiments tends to emphasize differences between the various embodiments, and their similarities or likenesses can be referred to each other. For the sake of brevity, the description will not be repeated here.

The term "and/or" in the specification is only an association relationship that describes associated objects, which means that there can be three relationships, for example, object A and/or object B may mean three cases that: object A exists alone, object A and object B exist at the same time, and object B exists alone.

It should be noted that in this specification, terms "comprise", "include" or any other variants thereof are intended to cover non-exclusive inclusion, so that a process, method, article or device including a series of elements not only includes those elements, but also includes other elements that are not explicitly listed, or further includes elements inherent to the process, method, article, or device. If there are no more restrictions, an element defined by a sentence "including a . . . " does not exclude existence of other identical elements in a process, method, article, or device that includes the element.

In the embodiments provided by the present application, it should be understood that the disclosed device and method can be implemented in other ways. The device embodiments described above are merely illustrative. For example, the division of the units is only a logical function division, and there may be other division ways in actual implementation, for example, multiple units or components can be combined, or can be integrated into another system, or some features can be ignored or not implemented. In addition, the shown or discussed coupling, or direct coupling, or communication connection among various components can be indirect coupling or communication connection through some interfaces, devices or units, and can be electrical, mechanical or in other forms.

The above units described as separate components may be or may not be physically separate, and the components displayed as units may be or may not be physical units; they may be located in one place and may also be distributed on multiple network units; some or all of the units can be selected according to actual needs to achieve the purposes of the solutions of the embodiments.

In addition, various functional units in the embodiments of the present application may be all integrated in one processing unit, or each unit may be individually used as a unit, or two or more units may be integrated in one unit; the above integrated units of can be implemented in the form of hardware, and can also be implemented in the form of hardware plus software functional units.

One of ordinary skill in the art can understand that implementation of all or some of the operations of the above method embodiments can be completed by a program instructing relevant hardware. The foregoing program can be stored in a computer-readable storage medium. When the program is executed, operations including the foregoing method embodiments are executed; and the foregoing storage medium includes various media that can store program codes, such as a mobile storage device, a read only memory (ROM), a magnetic disk, an optical disc, etc.

Alternatively, if the aforementioned integrated unit of the present application is implemented in the form of a software function module and sold or used as an independent product, it may also be stored in a computer-readable storage medium. Based on this understanding, technical solutions of the embodiments of the present application in essence, or a part that contributes to related technologies, can be embodied in the form of a software product. The computer software product is stored in a storage medium and includes a number of instructions to enable an electronic device (which may be a mobile phone, a tablet computer, a notebook computer, a desktop computer, a server, a robot, a drone, etc.) to execute the whole or a part of the method described in each embodiment of the present application. The aforementioned storage medium includes: a U-disk, a mobile hard disk, an ROM, a magnetic disk, an optical disk, and other media that can store program codes.

The methods disclosed in the several method embodiments provided by the present application can be combined arbitrarily without conflict to obtain new method embodiments.

The features disclosed in the several product embodiments provided by the present application can be combined arbitrarily without conflict to obtain new product embodiments.

The features disclosed in the several method or device embodiments provided by the present application can be combined arbitrarily without conflict to obtain new method embodiments or device embodiments.

The above described are only the implementation manners of the present application, but the protection scope of the present application is not limited to this. Any change or substitution that can be easily considered by those skilled in the art within the technical scope disclosed by the present application should be covered in the protection scope of the present application. Therefore, the protection scope of the present application should be subject to the protection scope of the claims.

What is claimed is:

1. A positioning method, comprising:
according to an intrinsic parameter matrix of an image acquisition module and depth values of multiple pixel points in a depth image captured by the image acquisition module, converting pixel coordinates of the multiple pixel points into camera coordinates; and
matching a camera coordinate of each pixel point with target world coordinates of multiple voxels in a pre-established point cloud map and obtaining a positioning result of the image acquisition module;
wherein the target world coordinate of each voxel is obtained by updating an initial world coordinate of each voxel according to multiple sample image pairs, and the sample image pair comprises a two-dimensional sample image and a depth sample image.

2. The method according to claim 1, wherein the point cloud map is established by operations comprising:
obtaining initial world coordinates of multiple voxels by quantifying a size of a specific physical space;
according to multiple sample image pairs captured in the specific physical space by the image acquisition module, obtaining a target world coordinate of each voxel by updating an initial world coordinate of each voxel; and
establishing a point cloud map according to the target world coordinate of each voxel.

3. The method according to claim 2, wherein the according to multiple sample image pairs captured in the specific physical space by the image acquisition module, obtaining a target world coordinate of each voxel by updating an initial world coordinate of each voxel comprises:
controlling the image acquisition module to capture sample image pairs according to a preset frame rate;
according to a first sample image pair captured at a current moment and a second sample image pair captured at a historical moment by the image acquisition module, updating an initial world coordinate of each voxel; and
according to the first sample image pair and a third sample image pair captured at a next moment by the image acquisition module, continuously updating a current world coordinate of each voxel; and until collection of sample images ends, taking a current world coordinate of each voxel as a target world coordinate.

4. The method according to claim 3, wherein the according to a first sample image pair captured at a current moment and a second sample image pair captured at a historical moment by the image acquisition module, updating an initial world coordinate of each voxel comprises:
according to the first sample image pair and the second sample image pair, determining a current camera coordinate of each voxel;
acquiring a depth value corresponding to a current pixel coordinate of each voxel from the depth sample image in the first sample image pair; and
according to a current camera coordinate of each voxel and a depth value corresponding to a current pixel coordinate of each voxel, updating an initial world coordinate corresponding to the voxel.

5. The method according to claim 4, wherein the according to a current camera coordinate of each voxel and a depth value corresponding to a current pixel coordinate of each voxel, updating an initial world coordinate corresponding to the voxel comprises:
acquiring a historical distance from each voxel to a surface of an object;
inputting a Z axis coordinate value of a current camera coordinate of each voxel, a depth value corresponding to a current pixel coordinate of each voxel, and a historical distance from each voxel to the surface of the object into a distance model corresponding to the voxel to update the historical distance and obtain a target distance; and
updating a target distance from each voxel to the surface of the object into a Z axis coordinate value in an initial world coordinate corresponding to the voxel, so as to realize updating of the initial world coordinate corresponding to the voxel.

6. The method according to claim 4, wherein the according to the first sample image pair and the second sample image pair, determining a current camera coordinate of each voxel comprises:
according to the first sample image pair and the second sample image pair, determining a current transformation relationship of a camera coordinate system relative to a world coordinate system; and
according to the current transformation relationship, converting an initial world coordinate of each voxel into a current camera coordinate.

7. The method according to claim 4, wherein the acquiring a depth value corresponding to a current pixel coordinate of each voxel from the depth sample image in the first sample image pair comprises:
according to the intrinsic parameter matrix of the image acquisition module, converting a current camera coordinate of each voxel into a current pixel coordinate; and
obtaining a depth value corresponding to the current pixel coordinate of each voxel from the depth sample image in the first sample image pair.

8. The method according to claim 1, wherein the matching a camera coordinate of each pixel point with target world coordinates of multiple voxels in a pre-established point cloud map and obtaining a positioning result of the image acquisition module comprises:
according to an iteration strategy, matching a camera coordinate of each pixel point with target world coordinates of the multiple voxels, and obtaining a target transformation relationship of a camera coordinate system relative to a world coordinate system; and according to the target transformation relationship, determining a positioning result of the image acquisition module.

9. The method according to claim 8, wherein the according to an iteration strategy, matching a camera coordinate of each pixel point with target world coordinates of the multiple voxels, and obtaining a target transformation relationship of a camera coordinate system relative to a world coordinate system comprises:
selecting an initial target voxel matching with each pixel point from the multiple voxels;
according to a camera coordinate of each pixel point and a target world coordinate of a corresponding initial target voxel, determining a first transformation relationship of the camera coordinate system relative to the world coordinate system;
according to the first transformation relationship, the camera coordinate of each pixel point, and the target world coordinates of the corresponding initial target voxels, determining a matching error;
in response to the matching error being larger than a preset threshold value, re-selecting the initial target voxel, and re-determining the matching error; and
determining a re-determined first transformation relationship of which the matching error is less than or equal to the preset threshold value as a target transformation relationship.

10. The method according to claim 9, wherein the selecting an initial target voxel matching with each pixel point from the multiple voxels comprises:
acquiring a second transformation relationship of a camera coordinate system relative to a world coordinate system;
according to the second transformation relationship and a camera coordinate of a jth pixel point, determining a first world coordinate of the jth pixel point, wherein j is an integer being larger than 0; and
obtaining corresponding initial target voxels by matching a first world coordinate of each pixel point with target world coordinates of the multiple voxels.

11. The method according to claim 9, wherein the according to the first transformation relationship, the camera coordinate of each pixel point, and the target world coordinates of the corresponding initial target voxels, determining a matching error comprises:
according to the first transformation relationship and the camera coordinate of the jth pixel point, determining a second world coordinate of the jth pixel point, wherein j is an integer being larger than 0; and
according to the second world coordinate of each pixel point and the target world coordinate of the corresponding initial target voxel, determining the matching error.

12. The method according to claim 11, wherein the according to the second world coordinate of each pixel point and the target world coordinate of the corresponding initial target voxel, determining the matching error comprises:
determining a distance between the second world coordinate of each pixel point and the target world coordinate of the corresponding initial target voxel; and
determining the matching error according to each of these distances.

13. The method according to claim 10, wherein if the matching error is larger than a preset threshold value, re-selecting the initial target voxel comprises:
in response to the matching error being larger than a preset threshold value, using the first transformation relationship as the second transformation relationship, and re-selecting the initial target voxels.

14. An electronic device comprising a memory and a processor, wherein the memory stores a computer program executable in the processor, and the processor, when executing the program, implements operations comprising:
according to an intrinsic parameter matrix of an image acquisition module and depth values of multiple pixel points in a depth image captured by the image acquisition module, converting pixel coordinates of the multiple pixel points into camera coordinates; and
matching a camera coordinate of each pixel point with target world coordinates of multiple voxels in a pre-established point cloud map and obtaining a positioning result of the image acquisition module;
wherein the target world coordinate of each voxel is obtained by updating an initial world coordinate of each voxel according to multiple sample image pairs, and the sample image pair comprises a two-dimensional sample image and a depth sample image.

15. The electronic device according to claim 14, wherein the point cloud map is established by operations comprising:
obtaining initial world coordinates of multiple voxels by quantifying a size of a specific physical space;
according to multiple sample image pairs captured in the specific physical space by the image acquisition module, obtaining a target world coordinate of each voxel by updating an initial world coordinate of each voxel; and
establishing a point cloud map according to the target world coordinate of each voxel.

16. The electronic device according to claim 15, wherein the according to multiple sample image pairs captured in the specific physical space by the image acquisition module, obtaining a target world coordinate of each voxel by updating an initial world coordinate of each voxel comprises:
controlling the image acquisition module to capture sample image pairs according to a preset frame rate;
according to a first sample image pair captured at a current moment and a second sample image pair captured at a historical moment by the image acquisition module, updating an initial world coordinate of each voxel; and
according to the first sample image pair and a third sample image pair captured at a next moment by the image acquisition module, continuously updating a current world coordinate of each voxel; and until collection of sample images ends, taking a current world coordinate of each voxel as a target world coordinate.

17. The electronic device according to claim 16, wherein the according to a first sample image pair captured at a current moment and a second sample image pair captured at a historical moment by the image acquisition module, updating an initial world coordinate of each voxel comprises:
according to the first sample image pair and the second sample image pair, determining a current camera coordinate of each voxel;
acquiring a depth value corresponding to a current pixel coordinate of each voxel from the depth sample image in the first sample image pair; and
according to a current camera coordinate of each voxel and a depth value corresponding to a current pixel coordinate of each voxel, updating an initial world coordinate corresponding to the voxel.

18. The electronic device according to claim 17, wherein the according to a current camera coordinate of each voxel and a depth value corresponding to a current pixel coordinate of each voxel, updating an initial world coordinate corresponding to the voxel comprises:
 acquiring a historical distance from each voxel to a surface of an object;
 inputting a Z axis coordinate value of a current camera coordinate of each voxel, a depth value corresponding to a current pixel coordinate of each voxel, and a historical distance from each voxel to the surface of the object into a distance model corresponding to the voxel to update the historical distance and obtain a target distance; and
 updating a target distance from each voxel to the surface of the object into a Z axis coordinate value in an initial world coordinate corresponding to the voxel, so as to realize updating of the initial world coordinate corresponding to the voxel.

19. The electronic device according to claim 14, wherein the matching a camera coordinate of each pixel point with target world coordinates of multiple voxels in a pre-established point cloud map and obtaining a positioning result of the image acquisition module comprises:
 according to an iteration strategy, matching a camera coordinate of each pixel point with target world coordinates of the multiple voxels, and obtaining a target transformation relationship of a camera coordinate system relative to a world coordinate system; and
 according to the target transformation relationship, determining a positioning result of the image acquisition module.

20. A non-transitory computer-readable storage medium storing a computer program, wherein the computer program, when being executed by a processor, implements operations comprising:
 according to an intrinsic parameter matrix of an image acquisition module and depth values of multiple pixel points in a depth image captured by the image acquisition module, converting pixel coordinates of the multiple pixel points into camera coordinates; and
 matching a camera coordinate of each pixel point with target world coordinates of multiple voxels in a pre-established point cloud map and obtaining a positioning result of the image acquisition module;
 wherein the target world coordinate of each voxel is obtained by updating an initial world coordinate of each voxel according to multiple sample image pairs, and the sample image pair comprises a two-dimensional sample image and a depth sample image.

* * * * *